(12) United States Patent
Rhome (10) Patent No.: US 9,955,713 B2
(45) Date of Patent: *May 1, 2018

(54) SELF CONTAINED POPCORN POPPER

(75) Inventor: Timothy Allan Rhome, Fairfield, OH (US)

(73) Assignee: Gold Medal Products Co., Cincinnati, OH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/560,433

(22) Filed: Jul. 27, 2012

(65) Prior Publication Data

US 2012/0294999 A1   Nov. 22, 2012

Related U.S. Application Data

(63) Continuation of application No. 13/004,168, filed on Jan. 11, 2011, which is a continuation of application No. 10/560,540, filed as application No. PCT/US2005/006478 on Feb. 28, 2005, now Pat. No. 7,874,244.

(60) Provisional application No. 60/548,538, filed on Feb. 27, 2004.

(51) Int. Cl.
| | |
|---|---|
| *G07F 9/10* | (2006.01) |
| *A23L 7/183* | (2016.01) |
| *F24C 15/20* | (2006.01) |
| *A23L 7/187* | (2016.01) |

(52) U.S. Cl.
CPC .............. *A23L 7/183* (2016.08); *A23L 7/187* (2016.08); *F24C 15/20* (2013.01); *A23V 2002/00* (2013.01)

(58) Field of Classification Search
CPC ... A23L 1/1815; A23L 1/1812; G07F 17/0078
USPC ......... 99/323.5, 323.7, 323.9, 323.4, 323.11, 99/323.8; 126/41 R
See application file for complete search history.

(56) References Cited

U.S. PATENT DOCUMENTS

| | | | | |
|---|---|---|---|---|
| 1,457,854 | A | * | 6/1923 | Parks ........................... 99/323.5 |
| 1,594,190 | A | * | 7/1926 | Barnard ....................... 99/323.9 |
| 1,704,133 | A | * | 3/1929 | Le Claire ..................... 99/323.8 |
| 1,711,918 | A | * | 5/1929 | Burch .......................... 99/323.9 |
| 1,961,812 | A | * | 6/1934 | Burch .......................... 99/323.9 |
| 2,117,872 | A | * | 5/1938 | Barnard ....................... 99/323.5 |

(Continued)

FOREIGN PATENT DOCUMENTS

EP    0 806 169 A1    11/1997

OTHER PUBLICATIONS

Giles Foodservice Equipment, Brochure Form 65778-A for Ventless Hood Model OVH-10 (1 page).

(Continued)

*Primary Examiner* — Jimmy Chou
(74) *Attorney, Agent, or Firm* — Wood Herron & Evans LLP (57) ABSTRACT

An improved popcorn popper (10) has effluent filtration structure to treat the oil laden vapor and steam effluent from popping popcorn within the popper and with discharge of effluent having less than 5 milligrams of particulates per cubic meter of effluent discharged directly into the area in which the popper (10) is located. There is no need for external hoods or for external ducting of effluent to outside the area and facility in which the popcorn is popped. The filtering is carried out within the popper (10). A fire suppression system is provided to handle fires even within the kettle (14). Methods are disclosed.

7 Claims, 6 Drawing Sheets

(56) References Cited

U.S. PATENT DOCUMENTS

| | | | | |
|---|---|---|---|---|
| 2,134,682 A * | 11/1938 | Burch | | 99/323.7 |
| 2,228,959 A * | 1/1941 | Kloster | | 366/144 |
| 2,232,954 A * | 2/1941 | Manley | | 99/323.9 |
| 2,279,750 A * | 4/1942 | Gundelfinger | | 366/279 |
| 2,324,046 A * | 7/1943 | Van Doren et al. | | 312/124 |
| 2,654,823 A * | 10/1953 | Altemiller | | 219/436 |
| 2,902,920 A | 9/1959 | Waas | | |
| 2,907,264 A * | 10/1959 | Bushway | | 99/323.7 |
| 2,984,169 A * | 5/1961 | Bushway | | 99/323.9 |
| 3,102,032 A * | 8/1963 | Lippert | | 426/296 |
| 3,253,747 A * | 5/1966 | Thomas | | 222/88 |
| 3,272,111 A * | 9/1966 | Cretors | | 99/323.4 |
| 3,584,688 A | 6/1971 | Duncan et al. | | |
| 3,641,916 A * | 2/1972 | McDevitt | | G07F 17/0078 99/323.7 |
| 3,697,289 A * | 10/1972 | Day et al. | | 426/625 |
| 3,727,111 A | 4/1973 | Vaughn | | |
| 3,744,039 A * | 7/1973 | Hrbek et al. | | 365/120 |
| 3,744,216 A * | 7/1973 | Halloran | | 96/16 |
| 3,785,124 A * | 1/1974 | Gaylord | | 96/19 |
| 3,952,640 A * | 4/1976 | Kuechler | | 126/299 D |
| 4,171,667 A | 10/1979 | Miller et al. | | |
| 4,202,256 A | 5/1980 | Brooks | | |
| 4,288,686 A | 9/1981 | Cretors | | |
| 4,489,647 A | 12/1984 | Stamps et al. | | |
| 4,539,898 A | 9/1985 | Bishop et al. | | |
| 4,850,120 A | 7/1989 | Stein | | |
| 4,854,949 A * | 8/1989 | Giles et al. | | 96/58 |
| 4,941,400 A * | 7/1990 | Moore | | 99/403 |
| 5,033,363 A | 7/1991 | King et al. | | |
| 5,035,173 A | 7/1991 | Stein et al. | | |
| 5,082,334 A | 1/1992 | Beyer et al. | | |
| 5,129,386 A | 7/1992 | Meister | | |
| 5,154,161 A * | 10/1992 | Rogers et al. | | 126/299 D |
| 5,605,091 A | 2/1997 | Garber | | |
| 5,690,018 A * | 11/1997 | Hansen | | 99/330 |
| 5,694,830 A * | 12/1997 | Hodgson | | G07F 17/0078 99/323.7 |
| 5,697,450 A * | 12/1997 | Stehling et al. | | 169/65 |
| 5,771,779 A | 6/1998 | Stein et al. | | |
| 5,871,792 A * | 2/1999 | Weiss et al. | | 426/233 |
| 5,885,641 A * | 3/1999 | Hodgson et al. | | 426/445 |
| 5,920,668 A * | 7/1999 | Uehara et al. | | 385/27 |
| 6,000,318 A * | 12/1999 | Weiss | | G07F 17/0078 99/323.5 |
| 6,036,736 A * | 3/2000 | Wallace et al. | | 55/385.2 |
| 6,041,772 A * | 3/2000 | Ward | | F24C 15/20 126/299 D |
| 6,047,694 A * | 4/2000 | Landstrom et al. | | 126/25 C |
| 6,092,458 A * | 7/2000 | Weiss et al. | | 99/323.7 |
| 6,123,011 A | 9/2000 | Cretors | | |
| 6,125,838 A * | 10/2000 | Hedgpeth | | A47J 37/0713 126/305 |
| 6,135,011 A * | 10/2000 | Hodgson et al. | | 99/323.9 |
| 6,173,791 B1 * | 1/2001 | Yen | | 169/47 |
| 6,234,063 B1 * | 5/2001 | Evers et al. | | 99/323.7 |
| 6,235,090 B1 * | 5/2001 | Bernstein et al. | | 96/57 |
| 6,283,117 B1 | 9/2001 | Chiang | | |
| 6,382,087 B1 | 5/2002 | Iiyama | | |
| 6,412,395 B1 * | 7/2002 | Weiss et al. | | 99/323.7 |
| 6,510,901 B2 * | 1/2003 | Yen et al. | | 169/47 |
| 6,541,731 B2 * | 4/2003 | Mead et al. | | 219/121.7 |
| 6,672,201 B2 * | 1/2004 | Evans, Sr. | | A23L 7/187 99/323.5 |
| 6,726,945 B2 * | 4/2004 | Weiss | | 426/233 |
| 6,752,071 B1 * | 6/2004 | Snyder | | 99/323.5 |
| 6,829,982 B2 * | 12/2004 | Weiss et al. | | 99/323.7 |
| 6,833,022 B2 * | 12/2004 | Feisthammel et al. | | 95/91 |
| 6,838,639 B2 * | 1/2005 | Kreuter et al. | | 219/121.76 |
| 6,994,743 B2 * | 2/2006 | Brownell et al. | | 95/268 |
| 7,041,159 B2 * | 5/2006 | Entezarian et al. | | 96/135 |
| 7,166,140 B2 * | 1/2007 | Entezarian et al. | | 55/320 |
| 7,585,345 B2 * | 9/2009 | Smasal et al. | | 55/443 |
| 7,654,258 B2 * | 2/2010 | Negandhi et al. | | 126/299 D |
| 7,874,244 B1 * | 1/2011 | Rhome | | 99/323.9 |
| 8,049,134 B2 * | 11/2011 | Nomaru et al. | | 219/121.68 |
| 8,217,304 B2 * | 7/2012 | Cordingley et al. | | 219/121.76 |
| 8,276,504 B2 * | 10/2012 | Korin | | 99/323.5 |
| 8,316,760 B2 * | 11/2012 | Berthault | | 99/323.5 |
| 8,464,634 B2 * | 6/2013 | Cretors | | A23L 7/187 99/323.5 |
| 8,522,770 B2 * | 9/2013 | Colburn et al. | | 126/299 D |
| 2002/0061348 A1 * | 5/2002 | Weiss | | 426/233 |
| 2002/0078832 A1 * | 6/2002 | Weiss et al. | | 99/323.5 |
| 2002/0166454 A1 * | 11/2002 | Weiss et al. | | 99/323.7 |
| 2003/0047082 A1 * | 3/2003 | Weiss | | 99/323.5 |
| 2003/0106944 A1 * | 6/2003 | Doppelt | | 239/65 |
| 2003/0159590 A1 * | 8/2003 | Evans et al. | | 99/323.5 |
| 2003/0159591 A1 * | 8/2003 | Evans et al. | | 99/323.5 |
| 2004/0139858 A1 | 7/2004 | Entezarian et al. | | |
| 2004/0194633 A1 * | 10/2004 | Bourne | | 99/323.5 |
| 2006/0144245 A1 * | 7/2006 | Rhome | | 99/323.5 |
| 2008/0290078 A1 * | 11/2008 | Nomaru et al. | | 219/121.67 |
| 2009/0126579 A1 * | 5/2009 | Cretors et al. | | 99/323.11 |
| 2009/0133585 A1 * | 5/2009 | Rhome et al. | | 99/323.7 |
| 2011/0083562 A1 * | 4/2011 | Ryan et al. | | 99/323.7 |
| 2011/0120317 A1 * | 5/2011 | Rhome | | 99/323.5 |
| 2011/0185914 A1 * | 8/2011 | Snyder | | 99/323.5 |

OTHER PUBLICATIONS

European Patent Office, International Searching Authority, International Search Report and Written Opinion, corresponding to International Application No. PCT/US2005/006478 dated Jun. 3, 2005 (10 pages).

* cited by examiner

SELF CONTAINED POPCORN POPPER

CROSS-REFERENCE

The present application is a continuation application of co-pending U.S. Ser. No. 13/004,168, filed Jan. 11, 2011, which is a continuation application of U.S. Ser. No. 10/560,540, filed Feb. 28, 2005, now U.S. Pat. No. 7,874,244, issued on Jan. 25, 2011, which is a Section 371 of PCT International Application No. US05/06478 filed Feb. 28, 2005, which claims the benefit of the filing date of U.S. provisional patent application Ser. No. 60/548,538 entitled "SELF-CONTAINED POPCORN POPPER", filed in the U.S. Patent and Trademark Office effective Feb. 27, 2004, the disclosures of which are incorporated herein by reference in their entireties.

BACKGROUND OF THE INVENTION

This invention relates to popcorn poppers and more specifically to open or pass through poppers.

In the past, particularly with commercial or industrial capacity popcorn poppers used, for example, in theaters or other facilities where large quantities of popcorn are popped in sequential large batches and sold, it is common to install a large capacity popper in a custom installation with appropriate effluent ducting and fire suppression systems interconnected to the popper to meet a variety of codes and safety requirements.

Local and state building codes in the United States and elsewhere in the world require ventilation hoods over cooking equipment that produce grease laden vapors. Regulation, specification and code producing agencies in the United States include the National Fire Protection Association (NFPA), the American National Standards Institute (ANSI) and the Environmental Protection Agency (EPA) (see 202 Test Standards).

Large popcorn machines, typically found in movie theaters, are occasionally classified by local and state building inspectors as cooking equipment capable of producing sufficient grease laden vapors to require a ventilation hood. Sometimes in the United States, these are referred to as "Class 1" devices, requiring a hood with external discharge through ducting, a fire suppression system and outside make-up air.

Other systems or devices where a hood may exhaust into the area or space where the cooker is located are referred to as "Class 2" devices, but in these the hoods are not integrated into the cookers or devices.

While design and installation of a popper and its associated ducting, hoods and fire suppression systems can be accomplished easily in new facilities, the popcorn operation poses certain difficulties and expenses in new facilities and these problems are even worse in remodeling or attempted relocation or retrofitting of poppers in existing facilities. Such problems exist for both such "Class 1" and "Class 2" systems.

A typical ventilation system for a "Class 1" device includes an exhaust hood or canopy, ductwork, fan system, and a means of providing adequate makeup air as the "contaminated" air is exhausted from the building. There is a significant construction cost associated with this type of system for new construction and particularly for remodel projects where ductwork must penetrate existing structures.

For example, where such poppers produce significant amounts of steam or oil vapors, laden with solid articulates, which must be vented or captured, the installation of such a popper requires hood or ducting work which, in a large building, could add cost in the range of $70,000 or more to accommodate the popper. This cost applies not only to new installations, but to retrofits or remodeling. And where any retrofit or remodeling involves relocation of a popper or popper location, significant extra costs are incurred by the necessary ducting and fire suppression systems required by codes.

Moreover, when the popper is of the "pass-through" or "open" variety, where the chamber receiving popped corn directly from the kettle is open, for access from both sides, for example, and has no containing side wall, treatment of the oil and steam vapors and vapor borne solid particulates within such widely open cabinets is even more problematical.

An alternate approach is to employ a recirculating system where the contaminated air is captured, filtered and returned to the room or environment surrounding the popper (such as in a "Class 2" type device). Current UL/ANSI regulations define design requirements, test procedures and offer a listing service for those products under category "KNLZ".

Such regulations cover cooking equipment for commercial use, such as pressurized deep fat fryers and other appliances for use in commercial kitchens, restaurants or other business establishments where food is prepared. Each appliance covered in this category has an integral recirculating air system to limit the emission of grease-laden air from the cooking process to the room ambient within the limit of 5 mg/m$^3$. Hood location, structure and placement is of concern and must be dealt with in coordination with popper installation.

Nevertheless, popcorn poppers of high capacity for commercial installations typically generate more oil and steam-laden vapors and solid particulates, including smoke, than can be handled by known recirculating or self-contained popping systems. Such current high capacity poppers have thus required hooding and/or external ducting to comply with present codes.

Accordingly, it is desired to provide a large capacity popcorn popper, preferably of the open or pass-through configuration, which is wholly self-contained without any need for extraneous duct work or hoods, which can be placed at any location in a facility without regard to new or existing duct work, and yet which contains and captures oil and steam vapors and vapor borne solid particulates with an efficiency well within the various applicable codes, and which has a self-contained fire suppression system, also within applicable fire codes.

It is one objective of the invention to provide a popcorn popper having a production capability sufficient for a commercial installation such as in a theater, and which can be operated within applicable safety and building codes but without conducting oil and steam vapor or vapor borne solid particulates externally of the popper.

It is a further objective of the invention to provide an improved, large capacity popcorn popper which is self-contained and can be operated without external ducting for oil and steam vapor and vapor borne solid particulates, heretofore required for such capacity poppers in similar installations.

A yet further objective of the invention is to provide a large capacity popcorn popper for use in retrofitting or remodeling a commercial facility, such as a theater, without interconnection of such popper to any external duct work from said popper.

A yet further objective of the invention has been to provide an improved popcorn popper to facilitate installation of popcorn poppers in new and remodeled commercial facilities independently and separately of any exhaust ducting.

A further objective of the invention has been to provide an improved self-contained popcorn popper capable of internally separating from any effluent therefrom, such oil, vapor or vapor borne particulates as would violate applicable building or safety codes.

A further objective of the invention has been to provide an improved popcorn popper with improved filtration of vapor and particulate emissions.

A further objective of the invention has been to provide a high capacity popcorn popper without requiring external ducting nor separate hooding with exhaust into surrounding areas.

A further objective of the invention has been to provide a self-contained, high-capacity popcorn popper which discharges effluent into the area surrounding the popper but with less than 5 milligrams of particulate per cubic meter of effluent discharged.

Prior to the invention, there were difficulties in meeting these objectives.

In a pass-through high capacity popper, there are large open access areas on both sides in and to the bin or storage area where warm popped corn is stored. Effluents issuing from the kettle and the bin must be captured before escaping into the surrounding environment, but with the open pass-through configuration, it is difficult to meet strict discharge standards such as no more than 5 mg per cubic meter (5 mg/m$^3$) of particulates in the overall effluent discharged from the operation.

There are variations in the rate and pattern of discharged or untreated effluents from the operational stages of popping, dumping, storage and retrieval of popcorn. Some of these stages are attended by more rapid excess of steam and vapor, such as when the kettle lid is forced open by the popping popcorn, or when the popcorn is dumped from the kettle to bin, than a slower exit of steam and vapor from other operational stages. Moreover, varied effluent patterns and vortices occur during the operational processes. It is difficult to effectively capture and treat significantly all effluent from such varied operational stages and events.

There is a complex relationship between the nature of effluent, including volume, particulate size and total particulate capture on the one hand and reasonable filtration life and maintenance on the other. Too much air flow capacity can overdrive the effluent, driving otherwise filterable particulates through a filter for that particulate stage, prematurely, or can clog a filter system. Insufficient flow capacity may be insufficient to capture and entrain effluent from the open areas or sides of the popper during major effluent discharging events.

There are difficulties in overall design of a large capacity popper capable of both new and remodel installation, while providing self-contained effluent treatment without external ducting in both applications.

The provision of a fully self-contained popper without external effluent ducting raises fire suppression concerns in the areas of the kettle, popcorn storage area or bin, popping oil storage area and with the self-contained effluent treatment areas.

A further objective of the invention has been to provide a large capacity popcorn popper having "pass-through" or open side access to the popping area, yet having a fully self-contained vapor and particulate handling apparatus allowing use of the popper at full capacity without external ducting of vapor or particulate effluent.

SUMMARY OF THE INVENTION

To these ends, the invention contemplates an improved large capacity popcorn popper preferably of open or pass-through configuration and having a self contained vapor and particulate filtering apparatus which creates a flow of vapor popping and storage effluent into and through a series of traps and filters and emits an effluent cleaned of oil and particulates in a degree sufficient to meet applicable emission codes, i.e. within maximum of 5 milligrams of particulate solids produced per cubic meter (5 mg/m$^3$) of flow for eight hours of a production cooking cycle. The processed effluent can be exhausted into the ambient space or environment in which the popper is located, without external ducting or hooding of any sort. And a fire suppression system integral with the popper is operable to suppress fires in the popper, including oil fires in the popping kettle.

Accordingly, the popper according to the invention can be used in any suitable location without the provision of associated duct work and without the necessity to be connected to or slaved to any existing or new duct work, hoods or fire suppression system. Renovations of a facility without regard to cost of popper ducting or exhaust is thus possible, as is original architectural planning without any regard to popper ducting positioning or associated costs.

One embodiment of the invention includes an open or "pass-through" popcorn receiving chamber and preferably for popping popcorn and dumping popped popcorn therein, from where the popped popcorn can be accessed for service to purchasers, or in which it can be stored.

A plenum or effluent passage has an entry end or inlet above the bin proximate the kettle. A plurality of filtration stations comprising oil baffles and filter units are provided within a vapor effluent path through the passage. These stations treat or process the vapor effluent drawn to the suction side of a blower which discharges cleaned air or effluent. The blower and suction inlet is preferably located in the bottom of the popper cabinet (but may be elsewhere) and is sufficient to draw vapor produced by popcorn popping and popped popcorn into the passage and through the filtration stations for cleaning, with no significant untreated vapor escaping from the popper.

A particular series of selected baffles and filters are used to coordinate effluent flow sufficient to capture all significant effluent for treatment, yet not overdrive or clog filter operation. In particular, a large matrix pass-through baffle plate of staggered baffles is first encountered by the effluent where oil impinges on and "plates out" on the baffles, draining to a removal pan. The oil-cleaned effluent then flows to a second filtration stage comprising a high capacity filter sufficient to remove grease and salt particles from the effluent, but insufficient to remove smoke, containing other smaller particulates. The effluent then flows to a final filtration station which is preferably a high efficiency particulate arrester or "HEPA" type filter which captures the smaller smoke particles or components.

While the blower in the cabinet bottom is preferably rated at approximated 1200 CFM, the effluent velocity flow is kept below 500 FPM, and is thus insufficient to drive selected particles through the filters designed for those particle stages. Premature filter clogging is minimized or eliminated and the flow, filter sizes and filter life between cleaning and/or replacement is enhanced.

The baffles and filters are removable for replacement or cleaning. Sensors in the vapor path within the effluent passage sense pressures, indicative of flow, and signal when it is time to replace or clean the baffles or filters as a function of their efficiency, derated by pressure changes in the flow. Fail-safe sensors are electronically coupled to prevent popping once the sensed efficiencies drop below a predetermined level.

A fire suppression system is self-contained within the popper for suppressing any sensed fire therein. The kettle top is provided with a porosity sufficient to admit fire suppressant in the event of a kettle fire, and undesired fire is contained within the popper.

Through the use of any suitable electronic controls, and signals, a popping operation can be carried out automatically, with only acceptable effluent discharged, and without any effluent discharge beyond the popper environment or into any exhaust duct being necessary.

Such popper can thus be installed in a facility independent of and without regard to any exhaust ducting, saving significant cost in original or remodel construction.

BRIEF DESCRIPTION OF THE DRAWINGS

These and other objects and advantages will become readily apparent from the following written description and from the drawings, in which.

DETAILED DESCRIPTION OF THE INVENTION

Figure 1:
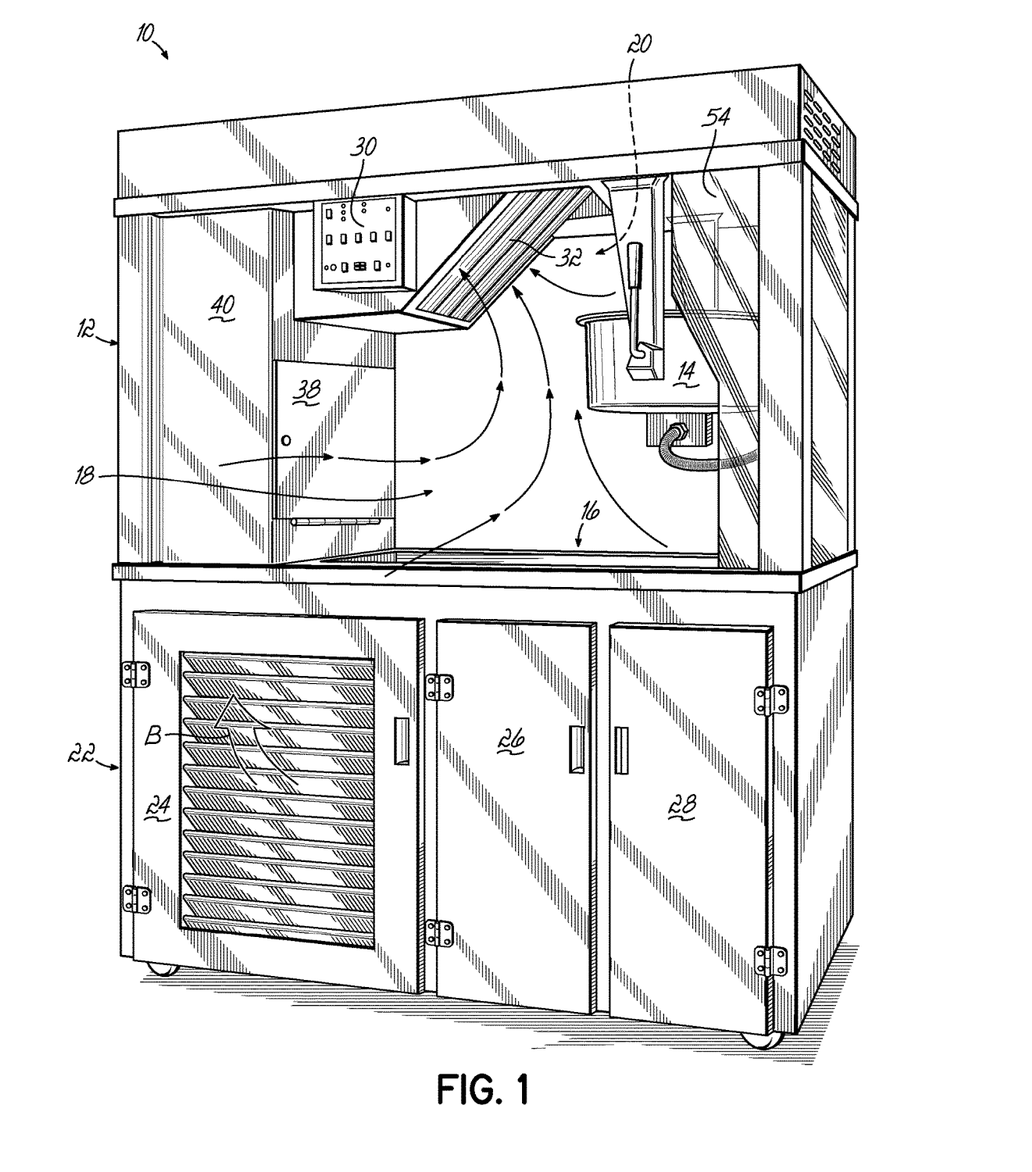
FIG. 1 is a perspective view of the invention.

More particularly, a popper 10 (FIG. 1) comprises an upper cabinet 12 having a kettle 14 for popping and discharging popped popcorn into the popcorn bin 16. Front side 18 and rear side 20 of cabinet 12 are open. Thus, bin 16 is accessible by operators from both the front and rear sides. The open sides provide operator access preferably to both the bin and to the kettle.

Popper 10 includes the upper cabinet portion 12 and a lower cabinet portion 22 having a vented door 24 and storage doors 26, 28 behind which components of a fire suppression system can be disposed.

Figure 4:
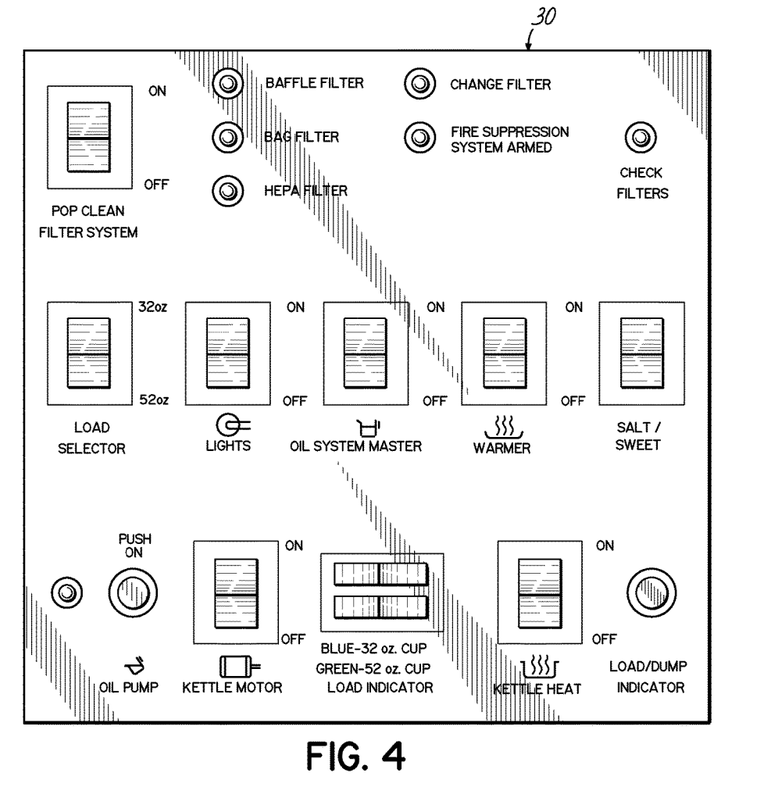
FIG. 4 is a layout view of a control panel of the popper of FIGS. 1 and 2.

A control panel 30 (FIGS. 1 and 4) is disposed preferably on upper cabinet portion 12, or in any suitable location.

Kettle 14 is any suitable popcorn popping kettle capable of preferably popping large batches of popcorn (not shown) for discharge into bin 16. Kernel charges or loads of 28 to 66 ounces of unpopped popcorn (for example) are typical for placement into kettle 14 for popping. In this regard, it will be appreciated that popper 10 is preferably of commercial, high production capacity for delivering successive batches of popped popcorn from load sizes such as this. A popping cycle of such a load can produce, for example, four pounds of steam and oil vapor and associated popping particulates from kettle 14 for each popping cycle. Poppers of other capacities, greater or lower, can benefit from the invention.

Figure 2:
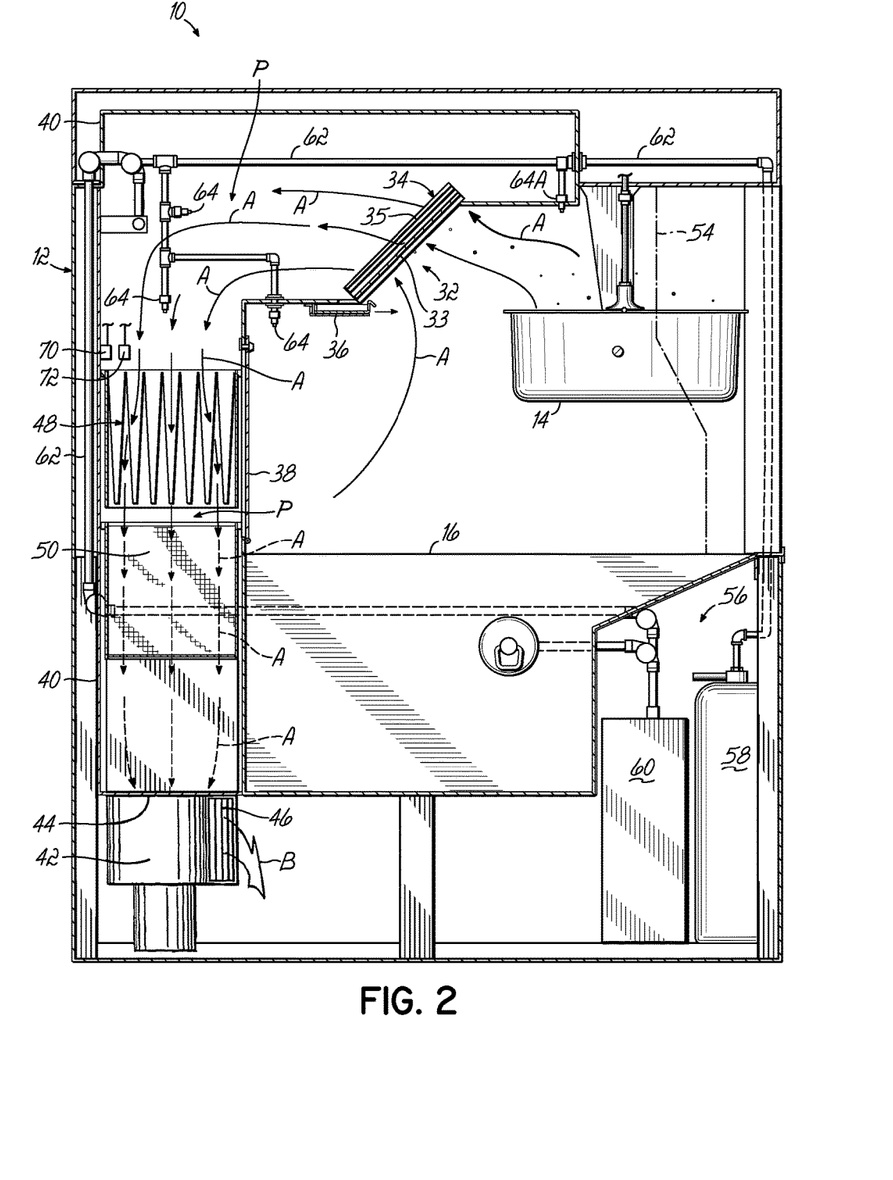
FIG. 2 is an elevational view in partial cross-section showing the flow path of vapor and effluent and a portion of a fire suppression system.

Turning now to FIG. 2, the invention is further seen in elevational cross-section. Oil baffle or trap 32 defines a vapor effluent inlet for receiving an intake of steam and oil laden vapor, and vapor borne particulates, from a cooking cycle of popcorn in kettle 14 and from bin 16. The flow of vapor effluent through the popper and filtration passage of popper 10 is illustrated by the arrows A in solid and dotted lines in FIGS. 1-3 for illustration. Clean air exits the popper 10 through door 24 as illustrated by arrow B, FIGS. 1 and 2.

Figure 3:
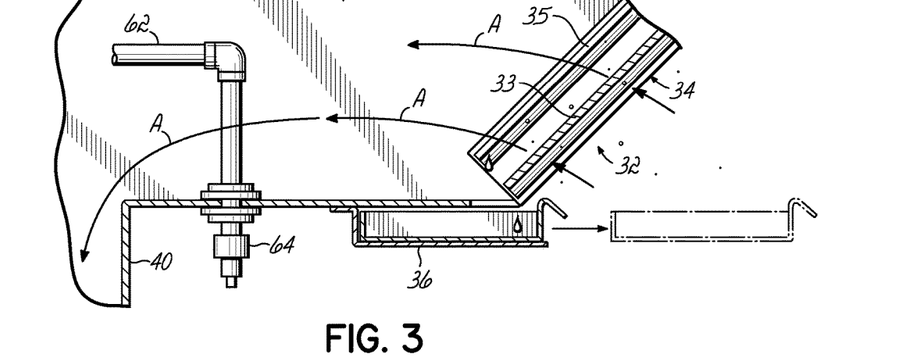
FIG. 3 is an enlarged cross-sectional view of an upper portion of the popper of FIGS. 1 and 2.

Baffle trap 32 comprises a plurality of staggered baffles 33, 35 defining a tortuous path for vapor flow wherein oil droplets are removed from the effluent vapor flow by impingement onto the baffle and flow to collection tray 36. The oil baffle or trap 32 is a "coarse" filter and includes a baffle plate 34 and a catch tray 36. Plate 34 comprises sets of a plurality of elongated baffles 33, 35 (FIG. 3) in offset fashion. Baffles 33 in a first set are slightly spaced apart with baffles 35 in a second set oriented in line with the spaces in the first set, so the vapor path is tortuous. When oil laden vapor flowing through baffle/trap 32 engages the baffles 33, 35, oil collects and dribbles down to catch tray 36, which can be removed as shown in FIG. 3.

Baffle or trap 32 comprises a passage inlet for vapor effluent (arrows A) through a vapor cleaning or filtering path P defined by passage 40 and terminating in blower 42 having its suction side 44 connected to passage 40 and its outlet side 46 disposed to blow effluent of cleaned or processed air or vapor out of the vented door 24.

Downstream of baffle or trap 32 is a suitable first filter 48 defining a first filtration station downstream of baffle 32. This filtration station comprises a medium filter, referred to as a "bag" filter, preferably comprising a fiberglass box filter of about 80% efficiency relative to the cleaning of steam and oil vapor. Such a filter is, for example, filter Model R-803-PH purchased from Total Filtration Systems of Cincinnati, Ohio.

From filter 48, the vapor effluent (A) flows through a suitable second filtration station comprising filter 50. One such suitable filter is preferably a hypoallergenic filter 50 referred to as a "HEPA" filter, which can be purchased from Total Filtration Systems of Cincinnati, Ohio, Model VPL-0395DOP. This final filter cleans the vapor effluent of smoke particulates or components.

From filter 50, the now cleaned effluent passes through passage 40 into the intake side 44 of blower 42 and through the outlet 46 of blower 42 where the processed air, significantly cleaned of oil and of particulates, is exhausted outside the popper as illustrated by the arrow B into the environment in which popper 10 is situated. Blower 42 can actually discharge the cleaned effluent into a lower chamber in the lower portion 22 of the popper, from where it is emitted into the surrounding environment through a vented door 24 (arrow B).

Figure 7:
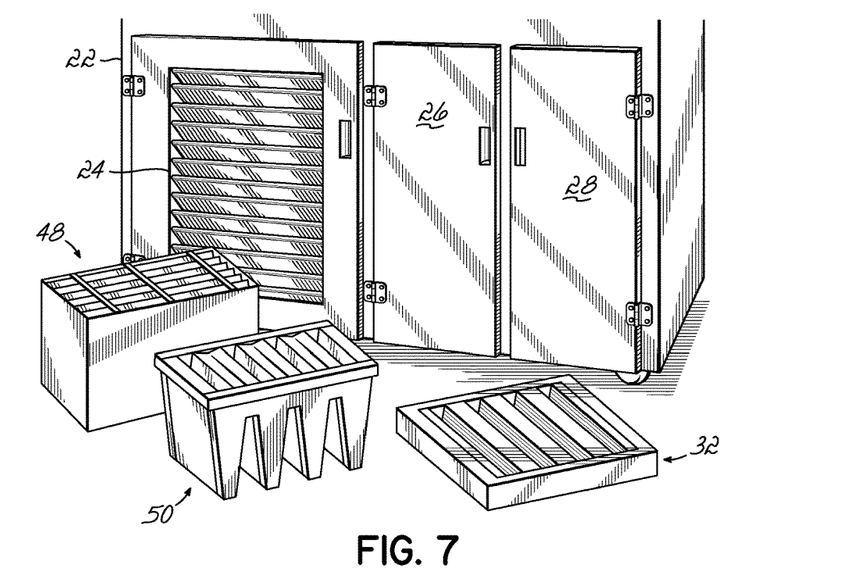
FIG. 7 is an illustrative perspective view of the popper of FIGS. 1 and 2 but showing the baffle plate and filters removed.

For illustration, the filters 48, 50 and baffle 32 are shown removed outside the popper 10 in FIG. 7 or cleaning or replacement. A door 38 in passage 40 provides access to the interior of the passage for replacement of filters 48 and 50.

Figure 5:
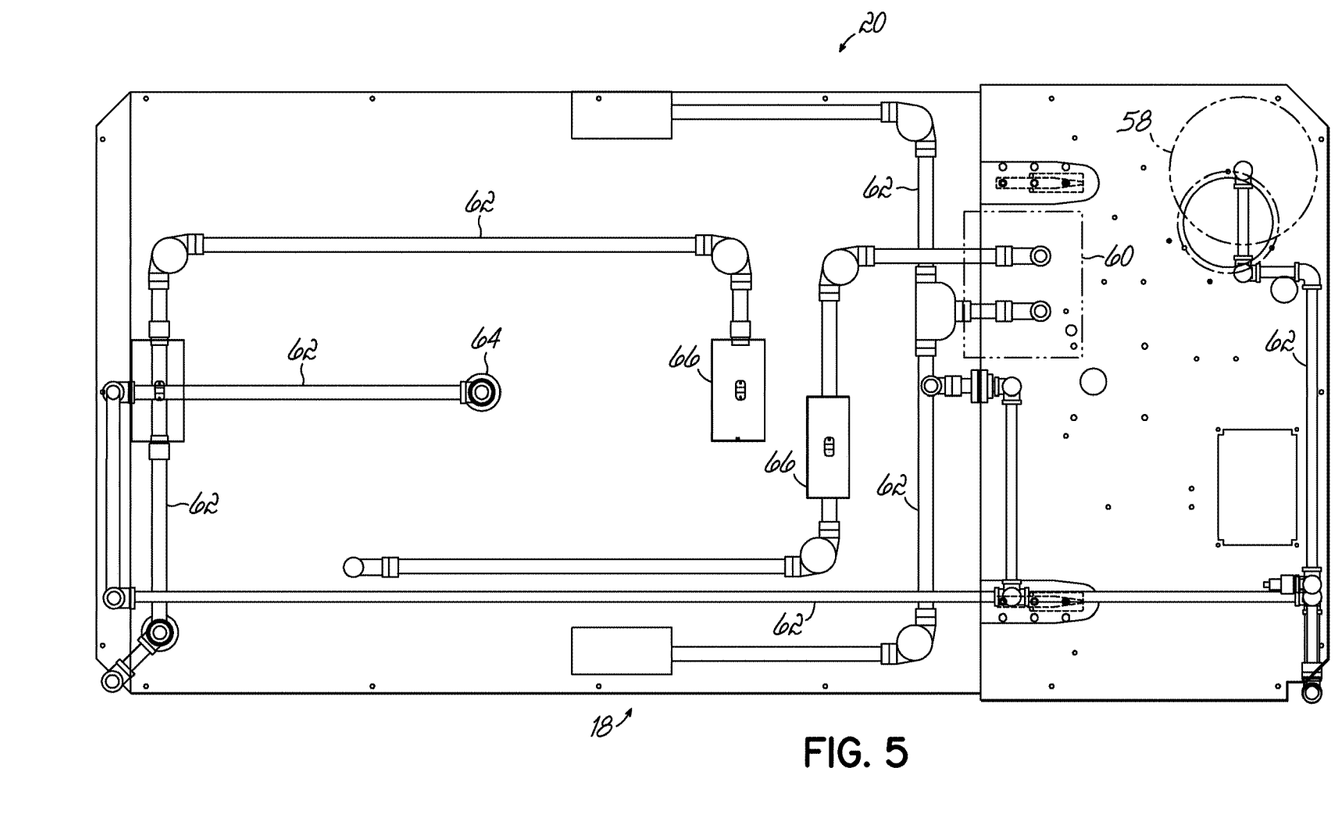
FIG. 5 is an illustrative view of a portion of the fire suppression system of the popper of FIGS. 1 and 2.
Figure 6:
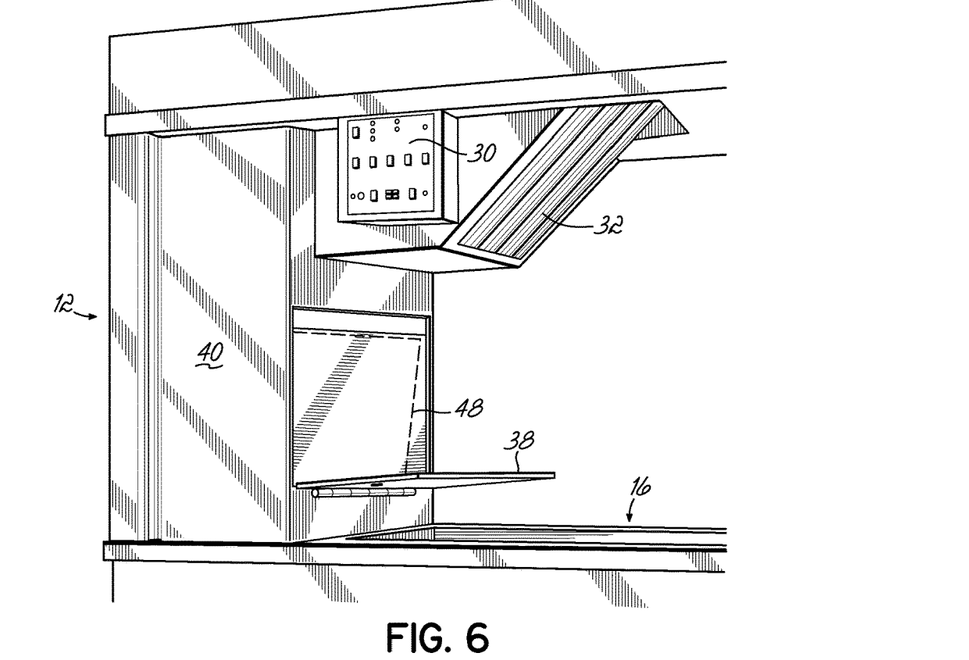
FIG. 6 is an illustrative perspective view of an upper portion of the popper of FIGS. 1 and 2; showing a filter access door open.

A fire suppression system 56 (FIG. 5) is comprised of a fire suppression agent tank 58, a propellant (such as CO2), tank 60, both disposed in a storage area behind doors 26, 28, as shown in FIG. 2, and a plurality of suppression agent delivery conduits 62 terminating in agent dispensing nozzles 64 disposed in appropriate positions to deliver suppression agent to a fire occurring in varied locations of popper 10. Such an array of conduits and nozzles is illustrated in FIG. 5, while a variety of nozzles 64, 64A are shown in FIG. 2.

A fire-sensing and suppression activity trigger system of any suitable variety can be used to initiate fire suppression on sensing a fire. One such system is the well-known "Ansul" System, available from Ansul Incorporated of Marinette, Wis. Such fire suppression systems can be seen in the Ansul webpage at www.ansul.com, and is incorporated herein by reference, although not necessary to an understanding of the invention herein.

Such system typically operates in a well known fashion on the basis of a tensioned cable and a plurality of fusible links 66 (FIG. 5) serially disposed in the cable. Heat can destroy a link, releasing cable tension and such release triggers or activates the fire suppression system to discharge suppression agent in a well known manner. A plurality of links are used in appropriate locations.

Returning to the flow of vapor in the direction of arrows A, sensors (not shown) are disposed in passage 40 to sense the presence or absence of any of the baffles or filters 32, 48 or 50. If any of these baffles or filters are absent, or not seated in a way so their presence is indicated by the dedicated server, an appropriate control prevents operation of the popper 10. In this way, appropriate vapor cleansing is assured.

It will be appreciated that blower 42 is preferably disposed in the lower portion 22 of cabinet 12, leaving the upper area of popper 10 free of blower structure, rendering it easier to handle air flow in the upper portion of cabinet 12. In this regard, blower 42 produces preferably about 1200 cubic feet per minute air flow. Through control of the blower size of passage 40 and parameters of the baffle 32 and filters 48, 50, effluent flow is preferably limited to 500 feet per minute or below. This dynamic produces sufficient suction to create a flow of substantially all vapor effluent produced from kettle 14 and from discharged popcorn in bin 16 into passage 40, and through baffle 32 and filters 48, 50. This is important in view of the open, pass-through sides 18, 20 of cabinet 12 through which vapors might otherwise escape.

Moreover, leaving the top of the upper cabinet 12 free of blower structure and concerns reduces its bulk and allows popper 10 to be located in areas without concerns of extraneous or unnecessary dome or hood sizes. Blower 42 and passage 40 could otherwise be located in other disposition and location in or on the popper 10.

Also, wing panels 54 (FIG. 1) can be used to help define flow around kettle 14 toward baffle/trap 32.

Another feature of the invention includes monitoring of the vapor flow as a function of filter efficiency to confirm the vapors and particulars are being cleaned to the design specifications. This is accomplished by pressure sensors disposed within passage 40 to sense the pressure of effluent flowing therein. If the design flow capacity suffers a reduction, such as a 25% reduction in flow, for example, as a function of flow pressure change, indicating a clogged filter, the popping system is electronically disabled, pending filter replacement or cleaning.

To this end, one pressure sensor 70 (FIG. 2) senses a flow pressure decrease indicating the system is approaching a 25% reduction in flow capacity, warning a user to replace or clean the filters. A second pressure sensor 72 is set to indicate a higher limit reduction flow, for example, as a function of a higher pressure at which time a current popping cycle continues, but a signal is generated and further popping cycles are blocked until filters are replaced or cleaned. Thus, the invention provides both a fail safe to disable popping where combined operation may overpower the vapor processing parameters and an earlier warning that efficiency is sufficiently reduced to warrant baffle or filter cleaning or replacement.

Sensors can be placed selectively upstream or downstream of each filter 48, 50 to indicate the status of each filter.

Status indicators, such as lights are used on panel 30 (FIG. 4) to indicate that the filters are in place and to indicate filter status. Status lights also indicate the need to check or to service (replace) filters.

Another feature of the invention includes suppression agent nozzle 64A (FIG. 2) located above kettle 14. It is important in fire suppression systems that suppression agent is directed onto the fire at its source. In popping popcorn, hot oil is used in kettle 14. If that oil in kettle 14 ignites, such as during popping when the kettle is covered with a top, it is necessary to apply suppression agent to the fire in the kettle. But the typical kettle is blocked by the top.

The invention contemplates a grid-like, or porous top, or other baffle-modified top having a plurality of baffles disposed to prevent oil from spattering out of the kettle, but having sufficiently open interstices through the baffles of the top to allow suppression agent from nozzles such as 64A to be introduced, in the advent of sensed (as desired) excess heat, fire, into the kettle 14 to suppress any fire therein. Escape of heavy oil drops or particulates is thus prevented while, at the same time, sufficient ingress of necessary fire suppression agent is facilitated.

Moreover, such a kettle top provides another benefit, and that being the performance of allowing the smoke and other effluents of the cooking process to vent from the kettle as they are created, rather than all at once (such as when the popped corn is dumped), which could overload the filtration provided or discharge unfiltered effluent outside the popper. Thus, the kettle top acts as an initial baffle or screen, upstream of baffle 32, and at the kettle to prevent larger oil droplets and particulates from entering the effluent flow to be filtered in passage 40 allowing oil to drop back into kettle 14. Also, the porous top does not fan the cooking effluents when popped corn is dumped from the kettle, which could push smoke or vapor into areas of the cabinet where it would not be readily captured in the filtration flow.

The kettle top can be of any suitable configuration, preferably defining a porous or preferably tortuous path for egress of smoke and vapor and, at the same time, ingress of any necessary fire suppression agent.

Figure 8:
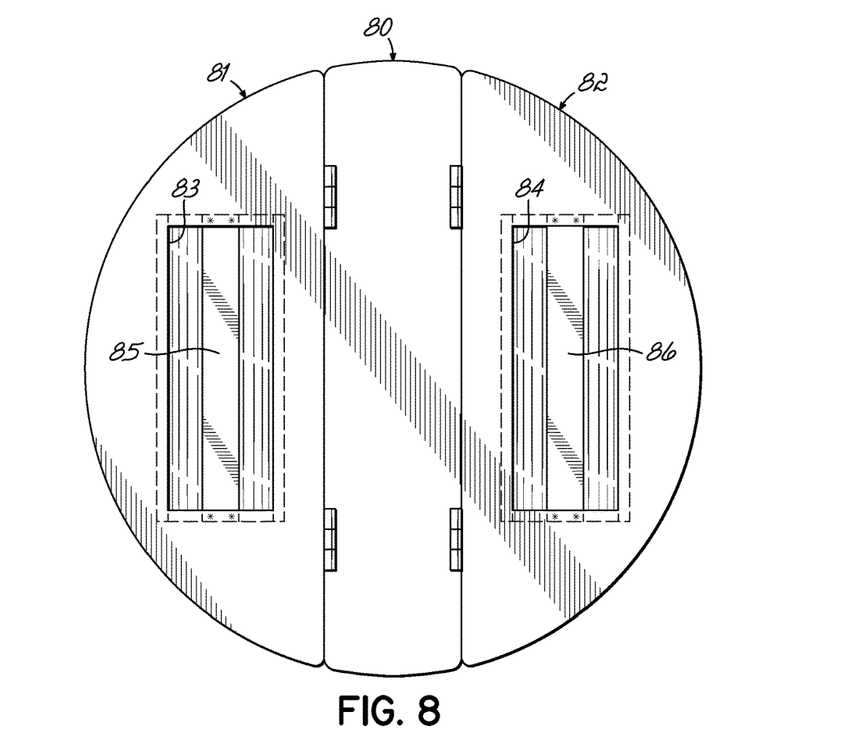
FIG. 8 is another plan view of a kettle top according to one aspect of the invention.
Figure 9:
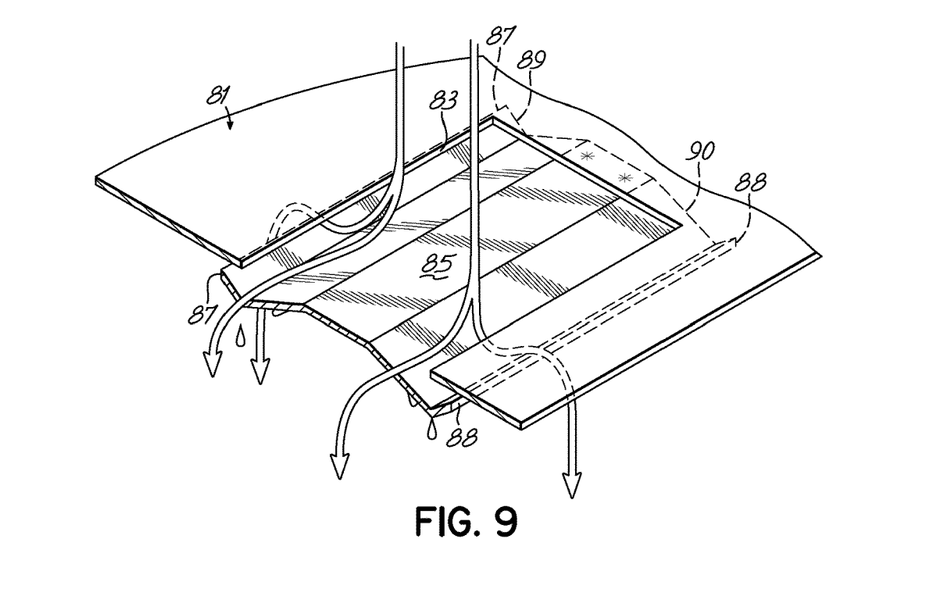
FIG. 9 is a perspective view of the top of FIG. 8 illustrating the function of baffle kettle top.

One form of baffle-modified kettle top is shown in FIGS. 8 and 9. In FIG. 8, a kettle top has a central brace 80 of any suitable and typical configuration which may support any rotor or other kettle device as is well known. The kettle lid comprises a pivoted front lid 81 and a pivoted rear lid 82. Both are pivoted to member 80. Each lid 81, 82 includes a cut-out 83, 84 of any suitable shape, here shown as rectangular. Disposed beneath each cut out 83, 84 and welded to the underside of lids 81, 82 are respective baffles 85, 86.

Each baffle is preferably similar, only one being shown in FIG. 9, that is baffle 85 for front lid 81.

Baffles 85, 86 are "W" shaped as shown in FIG. 9. The edges 87, 88 of the baffles do not touch the underside of the lids. As well, ends 89, 90 of the baffles 85, 86 are open, while the elongated center apex of each baffle is secured as by spot welding to the underside of the respective lids 81, 82.

In a normal popping process, oil and oil laden vapor contact the underside of the baffles 85, 86. Oil and oil droplets in the vapor impact on the underside of the baffles 85, 86 and fall back into the kettle (illustrated in FIG. 9), while some oil-laden vapor and perhaps smoke and steam escape. This escape path is around the ends 87, 88 of the baffles 85, 86 and through the open ends at 89, 90.

If it is necessary to put out a fire in the kettle, an appropriate fire suppressant agent is emitted from a nozzle such as at 64A (FIG. 2) onto the kettle lids 81, 82 and particularly onto baffles 85, 86. This agent is introduced into the kettle over baffle edges 87, 88 and through ends 89, 90 at each end of each respective baffle 85, 86 in each lid 81, 82. The wide arrows in FIG. 9 demonstrate this flow. Fire in the kettle is thus effectively handled.

Accordingly, the invention provides an open, pass-through cabinet in a totally self-contained popcorn popper, eliminating the need for connection to separate ducting, hoods and venting for vapor effluent and steam.

The popper need not be limited in disposition to a fixed or design footprint in any new or remodeled facility, since it is free of duct work or hood connection, and of exterior or separate fire suppression trigger cables and the like.

The invention is useful in open-sided pass-through configurations as shown, in closed-sided configurations and in one open side configurations as well and particularly in commercial or high-capacity poppers popping kernel loads of 28 to 66 ounces, for example, in a single batch. Also, it can be used for poppers of the pivoted kettle variety shown herein, or in poppers where the kettle is pedestal mounted.

As well, the invention provides a popcorn popper of self-contained configuration, regardless of the orientation of filter passage and blower location, capable of emitting effluent of no more than 5 milligrams of particulate per cubic meter of effluent into the area within which the popper is placed.

The invention thus comprises the first known high-capacity popcorn popper where the entire filtration system is self-contained within the popper itself.

It will be appreciated that among its other features and advantages, the invention includes, singly and in variable combination: filter interlocks; filter replacement warnings as a function of filter performance measured by flow pressure; popping cut-off upon degradation of filter performance; a pre-filter stage baffle/trap 32 with oil catching tray; capture of all vapor, smoke and cooking effluent for processing; an open, pass-through cabinet defining in part a popped corn receiving bin; a gridded or tortuous path kettle top for egress of smoke and vapor and ingress of any necessary fire suppression agent; self-contained popper total placement freedom without operation ties to separate hoods, outside ducting or separate fire suppression systems; and passes current U.L., EPA and other standards for self-contained food cooking units producing oil vapors.

The popper of the invention can simply be put to use in any facility with no outside venting, ducting or separate hoods or fire suppression, yet still meet applicable codes. Initial facility design and remodeling are facilitated with reduced costs.

The popper 10 can accommodate variation in loads of kernels to be popped, and popping of corn for both sugar and salt applications and the like.

Appropriate solid state controls, computers, programmable logic controllers (PLCs), CPUs or the like can be used to control the functions, sensors, interlocks, suppression systems, cooking, dumping, oil pumping, batch size, batch type, lights, kettle drive, kettle heat, kettle dump and other parameters of the popper 10, and such as described in U.S. Pat. Nos. 6,829,982; 6,752,071; 6,726,945; 6,672,201 and 6,135,011, each of which is incorporated herein by express reference.

These and other advantages and modifications will be readily apparent to those of ordinary skill in the art without departing from the scope of the invention and applicant intends to be bound only by the claims appended hereto.

What is claimed is:

1. A self-contained popcorn popper for use in an area, comprising:
   a cabinet including a popcorn receiving chamber;
   a popcorn popping kettle assembly including a kettle and a kettle top located within the popcorn receiving chamber;
   a popped popcorn bin in the popcorn receiving chamber for receiving popped popcorn from the kettle;
   a self-contained vapor and particulate filtering system integrated with the self-contained popcorn popper and being configured to remove oil and particulates from a vapor effluent issuing from the popping of popcorn in the kettle; and
   a self-contained fire suppression system integrated with the self-contained popcorn popper and being configured to suppress a fire within the self-contained popcorn popper through emission of a fire suppression agent via the fire suppression system,
   wherein the kettle top has at least one opening and baffle structure rigidly fixed in a stationary position relative to and supported by the kettle top beneath the at least one opening and the kettle top,
   wherein the baffle structure is configured to define a tortuous path for egress of smoke and vapor from the kettle and to allow ingress of the fire suppression agent emitted by the fire suppression system into the kettle,
   and further wherein the baffle structure and the at least one opening are movable relative to the kettle in response to at least a portion of the kettle top moving relative to the kettle, wherein the fire suppression system comprises a source of a fire suppression agent and a plurality of suppression agent delivery conduits terminating in a plurality of agent dispensing outlets located within the self-contained popcorn popper.

2. The popper as in claim 1 wherein the fire suppression system is further configured to suppress a fire within the kettle.

3. The Popper as in claim 1 wherein the plurality of agent dispensing outlets comprise a plurality of agent dispensing nozzles located within the self-contained popcorn popper.

4. The popper as in claim 3 wherein at least one of the plurality of agent dispensing nozzles is located within the vapor and particulate filtering system.

5. The popper as in claim 3 wherein at least one of the plurality of agent dispensing nozzles is located within the popcorn receiving chamber.

6. The popper as in claim 3 wherein at least one of the plurality of agent dispensing nozzles is directed at the kettle.

7. The popper as in claim 3 wherein the cabinet has two opposite sides which are each open for operator access therein.

* * * * *

UNITED STATES PATENT AND TRADEMARK OFFICE
CERTIFICATE OF CORRECTION

| | | |
|---|---|---|
| PATENT NO. | : 9,955,713 B2 | Page 1 of 1 |
| APPLICATION NO. | : 13/560433 | |
| DATED | : May 1, 2018 | |
| INVENTOR(S) | : Timothy Allan Rhome | |

It is certified that error appears in the above-identified patent and that said Letters Patent is hereby corrected as shown below:

In the Specification

In Column 1, Line 66, change "laden with solid articulates," to --laden with solid particulates,--.

In Column 2, Line 29, change "structure and placement is of concern" to --structure and placement are of concern--.

In Column 4, Line 63, change "and/or replacement is enhanced." to --and/or replacement are enhanced.--.

In Column 6, Line 61, change "in FIG. 7 or cleaning or replacement." to --in FIG. 7 for cleaning or replacement.--.

In Column 7, Line 10, change "Such fire suppression systems can be seen" to --Such a fire suppression system can be seen--.

In Column 7, Line 53, change "vapors and particulars are being cleaned" to --vapors and particulates are being cleaned--.

In the Claims

In Claim 3, Column 10, Line 49, change "The Popper as in claim 1" to --The popper as in claim 1--.

Signed and Sealed this
Twenty-sixth Day of June, 2018

Andrei Iancu
*Director of the United States Patent and Trademark Office*